United States Patent
Zhou et al.

(10) Patent No.: US 12,328,734 B2
(45) Date of Patent: Jun. 10, 2025

(54) PRE-CONFIGURED ACTIVATION AND DEACTIVATION

(71) Applicant: QUALCOMM Incorporated, San Diego, CA (US)

(72) Inventors: Yan Zhou, San Diego, CA (US); Tao Luo, San Diego, CA (US); Jelena Damnjanovic, Del Mar, CA (US); Iyab Issam Sakhnini, San Diego, CA (US); Mahmoud Taherzadeh Boroujeni, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 653 days.

(21) Appl. No.: 17/182,934

(22) Filed: Feb. 23, 2021

(65) Prior Publication Data
US 2021/0266952 A1    Aug. 26, 2021

Related U.S. Application Data

(60) Provisional application No. 62/981,415, filed on Feb. 25, 2020.

(51) Int. Cl.
*H04W 72/23*        (2023.01)
*H04L 1/08*         (2006.01)
(Continued)

(52) U.S. Cl.
CPC .............. *H04W 72/23* (2023.01); *H04L 1/08* (2013.01); *H04L 5/0055* (2013.01); *H04L 41/0803* (2013.01)

(58) Field of Classification Search
CPC .......... H04W 2/23; H04L 1/08; H04L 5/0055; H04L 41/0803
See application file for complete search history.

(56) References Cited

U.S. PATENT DOCUMENTS

2017/0295594 A1 * 10/2017 Ozturk .................. H04W 72/23
2018/0294927 A1 * 10/2018 Takeda .................. H04L 1/1861
(Continued)

FOREIGN PATENT DOCUMENTS

| CN | 102781111 A | 11/2012 |
| CN | 104284425 A | 1/2015 |

(Continued)

OTHER PUBLICATIONS

Partial International Search Report—PCT/US2021/019436—ISA/EPO—Jun. 14, 2021.
(Continued)

*Primary Examiner* — Joseph A Bednash
(74) *Attorney, Agent, or Firm* — Harrity & Harrity LLP/Qualcomm Incorporated (57) ABSTRACT

Various aspects of the present disclosure generally relate to wireless communication. In some aspects, a user equipment (UE) may receive activation signaling for a configuration of a semi-persistent transmission procedure; activate the semi-persistent transmission procedure based at least in part on receiving the activation signaling; and deactivate the semi-persistent transmission procedure based at least in part on a deactivation time. In some aspects, the UE may activate the semi-persistent transmission procedure based at least in part on transmitting uplink feedback. Numerous other aspects are provided.

30 Claims, 6 Drawing Sheets

(51) Int. Cl.
 *H04L 5/00* (2006.01)
 *H04L 41/0803* (2022.01)

(56) References Cited

U.S. PATENT DOCUMENTS

| | | |
|---|---|---|
| 2019/0215848 A1 | 7/2019 | Pan et al. |
| 2019/0261354 A1* | 8/2019 | Fakoorian ............. H04L 1/1893 |
| 2019/0379518 A1 | 12/2019 | Yang et al. |
| 2020/0045706 A1* | 2/2020 | Shin ...................... H04W 72/23 |
| 2021/0274526 A1* | 9/2021 | Shin .................. H04W 72/1268 |
| 2021/0314925 A1* | 10/2021 | Shin ...................... H04L 5/0053 |

FOREIGN PATENT DOCUMENTS

| | | |
|---|---|---|
| CN | 109155993 A | 1/2019 |
| CN | 110121911 A | 8/2019 |
| CN | 106303977 B | 9/2019 |
| WO | 2018004268 A1 | 1/2018 |

OTHER PUBLICATIONS

International Search Report and Written Opinion—PCT/US2021/019436—ISA/EPO—Sep. 22, 2021.
Vice Chairman: "Report of E-UTRA User Plane Session", 3GPP TSG-RAN WG2 Meeting #63bis, 3GPP Draft, R2-085836-REPORT-RAN2-63BIS-LTE-UP, 3rd Generation Partnership Project (3GPP), Mobile Competence Centre, 650, Route Des Lucioles, F-06921 Sophia-Antipolis Cedex, France, No. Prague, Czech Republic, 20080929-20081003, 33 Pages, Oct. 3, 2008 (Oct. 3, 2008), XP050320584, [retrieved on Oct. 3, 2008], p. 24.

* cited by examiner

PRE-CONFIGURED ACTIVATION AND DEACTIVATION

CROSS-REFERENCE TO RELATED APPLICATION

This Patent application claims priority to U.S. Provisional Patent Application No. 62/981,415, filed on Feb. 25, 2020, entitled "PRE-CONFIGURED ACTIVATION AND DEACTIVATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for pre-configured activation and deactivation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving activation signaling for a configuration of a semi-persistent transmission procedure; activating the semi-persistent transmission procedure based at least in part on receiving the activation signaling; and deactivating the semi-persistent transmission procedure based at least in part on a deactivation time.

In some aspects, a method of wireless communication, performed by a UE, may include transmitting uplink feedback responsive to an attempt to receive a downlink transmission; activating a semi-persistent scheduling occasion or a pre-configured resource for a retransmission based at least in part on transmitting the uplink feedback; and communicating in the semi-persistent scheduling occasion or using the pre-configured resource for the retransmission.

In some aspects, a UE for wireless communication may include a memory and one or more processors operatively coupled to the memory. The memory and the one or more processors may be configured to receive activation signaling for a configuration of a semi-persistent transmission procedure; activate the semi-persistent transmission procedure based at least in part on receiving the activation signaling; and deactivate the semi-persistent transmission procedure based at least in part on a deactivation time.

In some aspects, a UE for wireless communication may include a memory and one or more processors operatively coupled to the memory. The memory and the one or more processors may be configured to transmit uplink feedback responsive to an attempt to receive a downlink transmission; activate a semi-persistent scheduling occasion or a pre-configured resource for a retransmission based at least in part on transmitting the uplink feedback; and communicate in the semi-persistent scheduling occasion or using the pre-configured resource for the retransmission.

In some aspects, a non-transitory computer-readable medium may store one or more instructions for wireless communication. The one or more instructions, when executed by one or more processors of a UE, may cause the one or more processors to receive activation signaling for a configuration of a semi-persistent transmission procedure; activate the semi-persistent transmission procedure based at least in part on receiving the activation signaling; and deactivate the semi-persistent transmission procedure based at least in part on a deactivation time.

In some aspects, a non-transitory computer-readable medium may store one or more instructions for wireless communication. The one or more instructions, when executed by one or more processors of a UE, may cause the one or more processors to transmit uplink feedback responsive to an attempt to receive a downlink transmission; activate a semi-persistent scheduling occasion or a pre-configured resource for a retransmission based at least in part on transmitting the uplink feedback; and communicate in the semi-persistent scheduling occasion or using the pre-configured resource for the retransmission.

In some aspects, an apparatus for wireless communication may include means for receiving activation signaling for a configuration of a semi-persistent transmission procedure; means for activating the semi-persistent transmission procedure based at least in part on receiving the activation signaling; and means for deactivating the semi-persistent transmission procedure based at least in part on a deactivation time.

In some aspects, an apparatus for wireless communication may include means for transmitting uplink feedback responsive to an attempt to receive a downlink transmission; means for activating a semi-persistent scheduling occasion or a pre-configured resource for a retransmission based at least in part on transmitting the uplink feedback; and means for communicating in the semi-persistent scheduling occasion or using the pre-configured resource for the retransmission.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
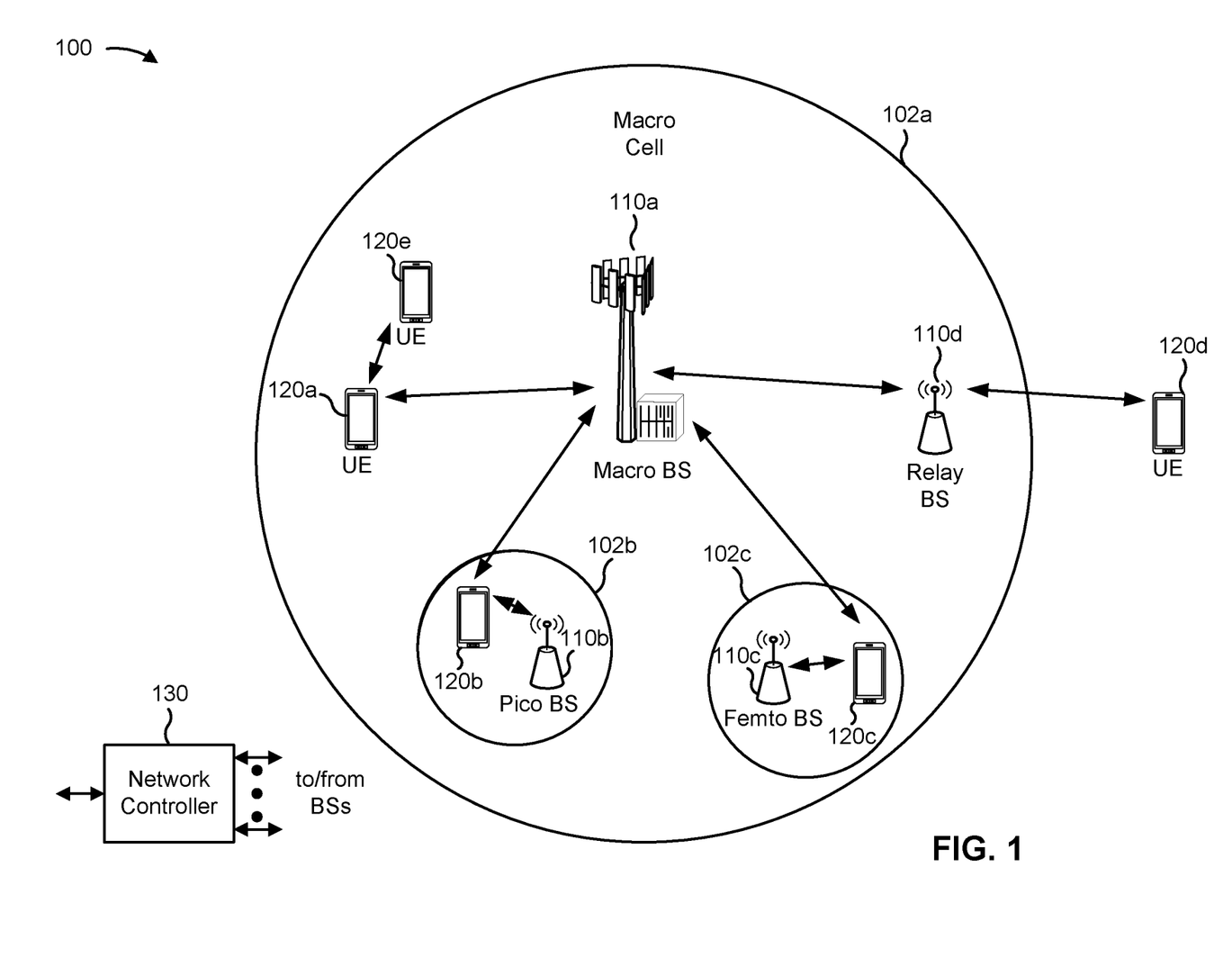
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHZ). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
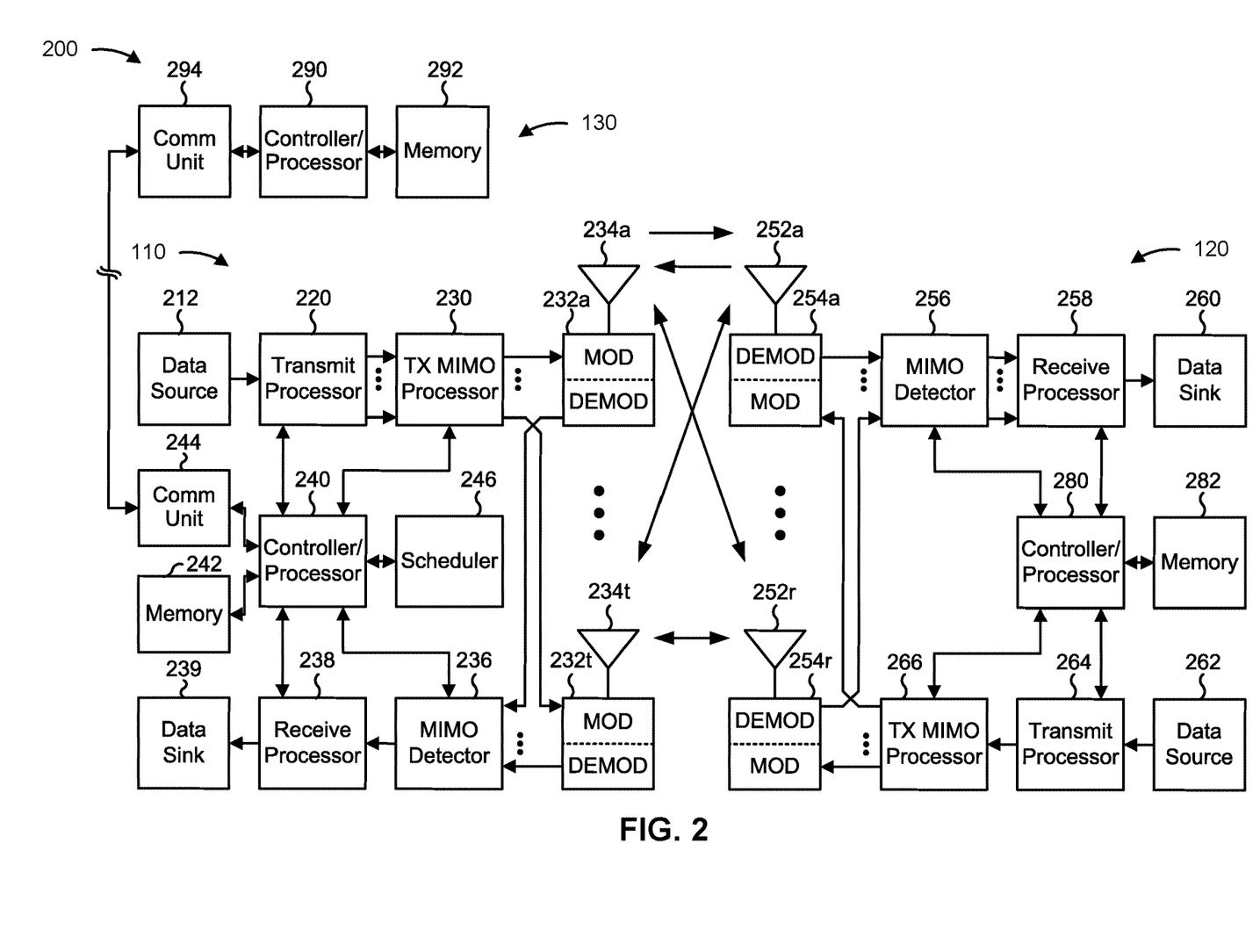
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver May include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-7.

Controller/processor 240 of base station 110, controller/processor 280 of UE 120, and/or any other component(s) of FIG. 2 may perform one or more techniques associated with pre-configured activation or deactivation, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for receiving (e.g., using antenna 252, DEMOD 254, MIMO detector 256, receive processor 258, controller/processor 280, memory 282, and/or the like) activation signaling for a configuration of a semi-persistent transmission procedure, means for activating (e.g., using controller/processor 280) the semi-persistent transmission procedure based at least in part on receiving the activation signaling, means for deactivating (e.g., using controller/processor 280) the semi-persistent transmission procedure based at least in part on a deactivation time, and/or the like. In some aspects, UE 120 may include means for transmitting (e.g., using controller/processor 280, transmit processor 264, TX MIMO processor 266, MOD 254, antenna 252, and/or the like) uplink feedback responsive to an attempt to receive a downlink transmission, means for activating (e.g., using controller/processor 280) a semi-persistent scheduling occasion or a pre-configured resource for a retransmission based at least in part on transmitting the uplink feedback, means for communicating (e.g., using controller/processor 280, transmit processor 264, TX MIMO processor 266, MOD 254, antenna 252, and/or the like) in the semi-persistent scheduling occasion or using the pre-configured resource for the retransmission, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some communications systems, semi-persistent transmission procedures may be used to enable UEs to communicate using semi-persistent resources. For example, a BS may configure a UE with a semi-persistent scheduling (SPS)/configured grant (CG) state in which the UE may periodically transmit on an uplink. Additionally, or alternatively, a BS may configure a UE with states associated with semi-persistent channel state information reference signal (CSI-RS), semi-persistent sounding reference signal (SRS), discontinuous reception (DRX) mode communication, and/or the like. A semi-persistent resource is a resource indicated to the UE by such a configuration, which may recur over a time period. The BS may transmit a first downlink control information (DCI) to activate the, for example, SPS/CG state and the UE may operate in the SPS/CG state (e.g., using semi-persistent resources) until the BS transmits a second DCI to deactivate the SPS/CG state. The SPS/CG or other state may be referred to herein as an SPS/CG procedure, a semi-persistent transmission procedure, or the like. However, in some cases, a duration in which the UE is to operate using a semi-persistent transmission procedure may be determinable before the UE starts the semi-persistent transmission procedure. For example, a BS may determine to switch the UE from a first component carrier to a second component carrier and use an SPS/CG state on the second component carrier to avoid interference on the first component carrier during a pre-configured period of time when another communication is to occur on the first component carrier. Additionally or alternatively, the BS may determine to switch the UE from the first component carrier to the second component carrier and use the SPS/CG state on the second component carrier because some higher priority traffic will use a resource on the first component carrier (e.g., a higher priority SPS or CG for another UE). As such, whether due to interference, higher priority traffic, or other reason, a known or expected interference or interruption having a known time duration can be mitigated by the BS transmitting activation signaling for a configuration of a semi-persistent transmission procedure having a deactivation time after which the semi-persistent transmission procedure can be deactivated (without explicit deactivation signaling).

Some aspects described herein may obviate a need for DCI signaling in activating or deactivating a semi-persistent transmission procedure. For example, a BS may transmit a DCI to activate the semi-persistent transmission procedure and may include information identifying a deactivation time for the semi-persistent transmission procedure. In this case, after expiration of the deactivation time, the UE may automatically deactivate the semi-persistent transmission procedure without receiving a DCI. In this way, the BS and the UE reduce signaling associated with using, for example, an SPS/CG state. Additionally, or alternatively, a semi-persistent transmission procedure (e.g., an SPS/CG state) may be automatically activated based at least in part on transmission of uplink feedback. For example, rather than waiting for a DCI to activate resources for retransmission of a failed communication, a UE may transmit, to a BS, uplink feedback indicating the failed communication, which may automatically activate a retransmission using SPS resources or pre-configured retransmission resources (e.g., CG resources). In this way, the UE and the BS obviate a need for DCI based activation of transmission resources, thereby reducing a utilization of network resources.

Figure 3:
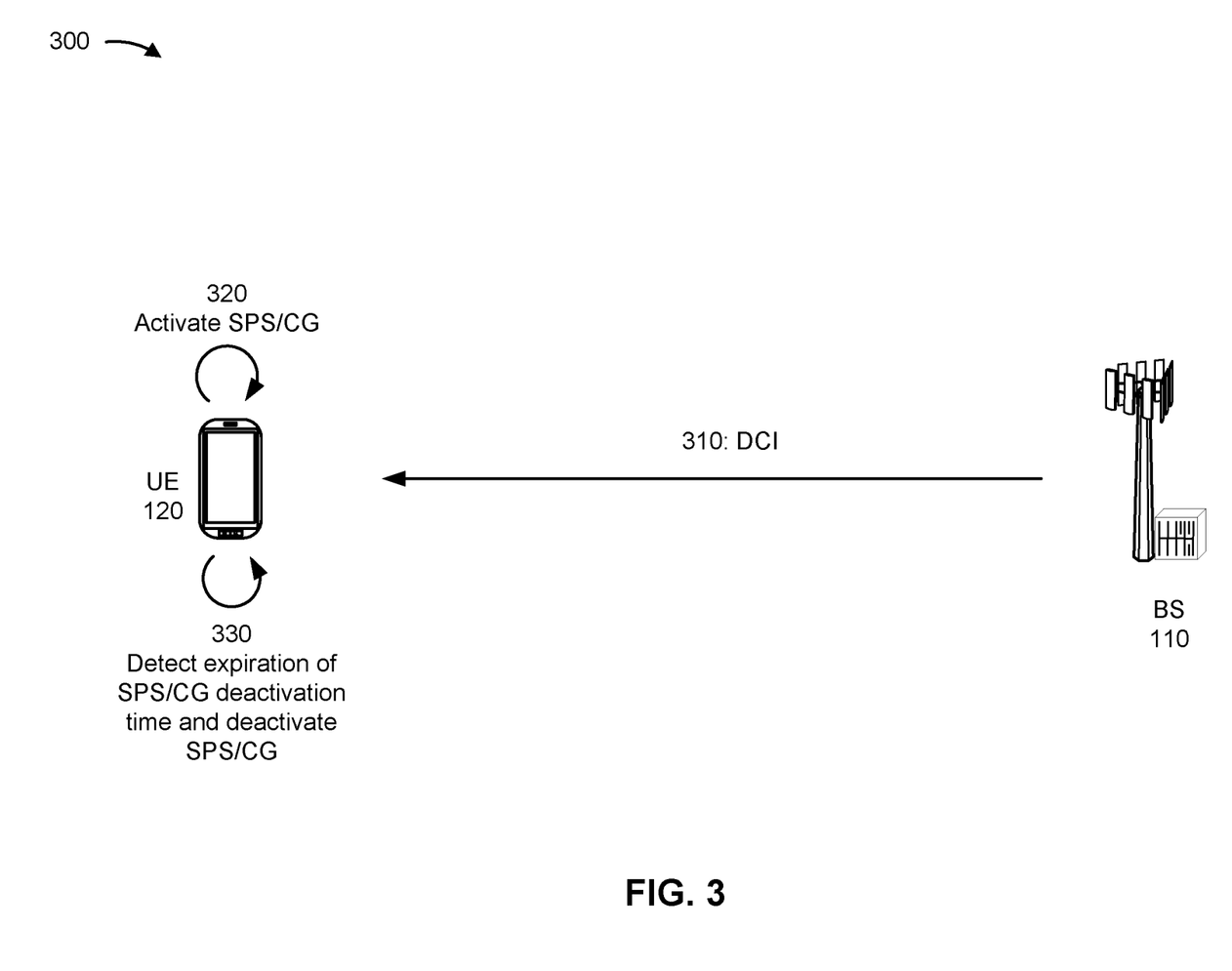
FIG. 3 is a diagram illustrating an example of pre-configured deactivation, in accordance with the present disclosure.

FIG. 3 is a diagram illustrating an example 300 of pre-configured deactivation, in accordance with the present disclosure. As shown in FIG. 3, example 300 includes a BS 110 and a UE 120.

As further shown in FIG. 3, and by reference number 310, BS 110 may transmit activation signaling for a semi-persistent transmission procedure to UE 120. Activation signaling is signaling to cause a UE 120 to activate a semi-persistent transmission procedure or an SPS transmission occasion associated with an SPS transmission procedure. For example, BS 110 may transmit a DCI to activate SPS/CG transmission (e.g., an SPS/CG state). Additionally, or alternatively, BS 110 may transmit signaling to activate semi-persistent CSI-RS signaling, semi-persistent SRS signaling, DRX mode communication, and/or the like.

In some aspects, UE 120 may identify a deactivation time based at least in part on the DCI. For example, UE 120 may parse the DCI to identify an included identifier of the deactivation time (e.g., a time for which SPS/CG transmission is to be active). Additionally, or alternatively, UE 120 may receive information identifying the deactivation time via a separate signal. For example, UE 120 may receive radio resource control (RRC) signaling configuring a deactivation time for one or more subsequent SPS/CG transmission activations. Additionally, or alternatively, UE 120 may receive a medium access control (MAC) control element (CE) identifying a deactivation time for one or more SPS/CG transmission activations.

In some aspects, BS 110 may provide a deactivation time indicator for a particular group of SPS/CG configuration identifiers. For example, BS 110 may provide the deactivation time indicator in connection with one or more SPS/CG configuration identifiers to cause the deactivation time to be applicable to SPS/CG activations associated with the one or more SPS/CG configuration identifiers. In some aspects, BS 110 may provide the deactivation time indicator to a particular group of UEs 120. For example, BS 110 may transmit a broadcast message, a multicast message, and/or the like to UE 120 and/or one or more other UEs 120 to identify the deactivation time for UE 120 and/or the one or more other UEs 120. Additionally, or alternatively, BS 110 may transmit a group-common DCI to UE 120 (and/or one or more other UEs 120) to identify the deactivation time. In this way, BS 110 reduces a utilization of network resources relative to transmitting separate signaling to each UE 120 in a network.

As further shown in FIG. 3, and by reference number 320, UE 120 may activate a semi-persistent transmission procedure. For example, UE 120 may activate SPS/CG transmission and/or an SPS/CG state. In some aspects, UE 120 may activate the SPS/CG transmission immediately based at least in part on receiving the DCI. Additionally, or alternatively, UE 120 may activate the SPS/CG transmission a threshold time after receiving the DCI to maintain synchronization with BS 110.

As further shown in FIG. 3, and by reference number 330, UE 120 may detect expiration of a deactivation time and deactivate the semi-persistent transmission procedure. For example, UE 120 may deactivate SPS/CG transmission based at least in part on expiration of a deactivation time. In some aspects, UE 120 may delay the deactivation of the SPS/CG transmission. For example, when UE 120 detects that there is still remaining data for transmission using SPS/CG resources, UE 120 may extend the SPS/CG transmission to accommodate the remaining data and may deactivate the SPS/CG transmission after an end of the extension of the SPS/CG transmission. In some aspects, UE 120 may enter a default configuration after deactivating the SPS/CG transmission. For example, UE 120 may be configured (e.g., by BS 110) with a default SPS/CG configuration and may return to the default SPS/CG configuration after deactivation. Additionally, or alternatively, UE 120 may switch component carriers after deactivation. For example, when UE 120 switches from a first carrier to a second carrier to activate SPS/CG transmission on the second carrier, UE 120 may return to the first carrier after deactivating SPS/CG transmission on the second carrier.

As indicated above, FIG. 3 is provided as an example. Other examples may differ from what is described with respect to FIG. 3.

Figure 4:
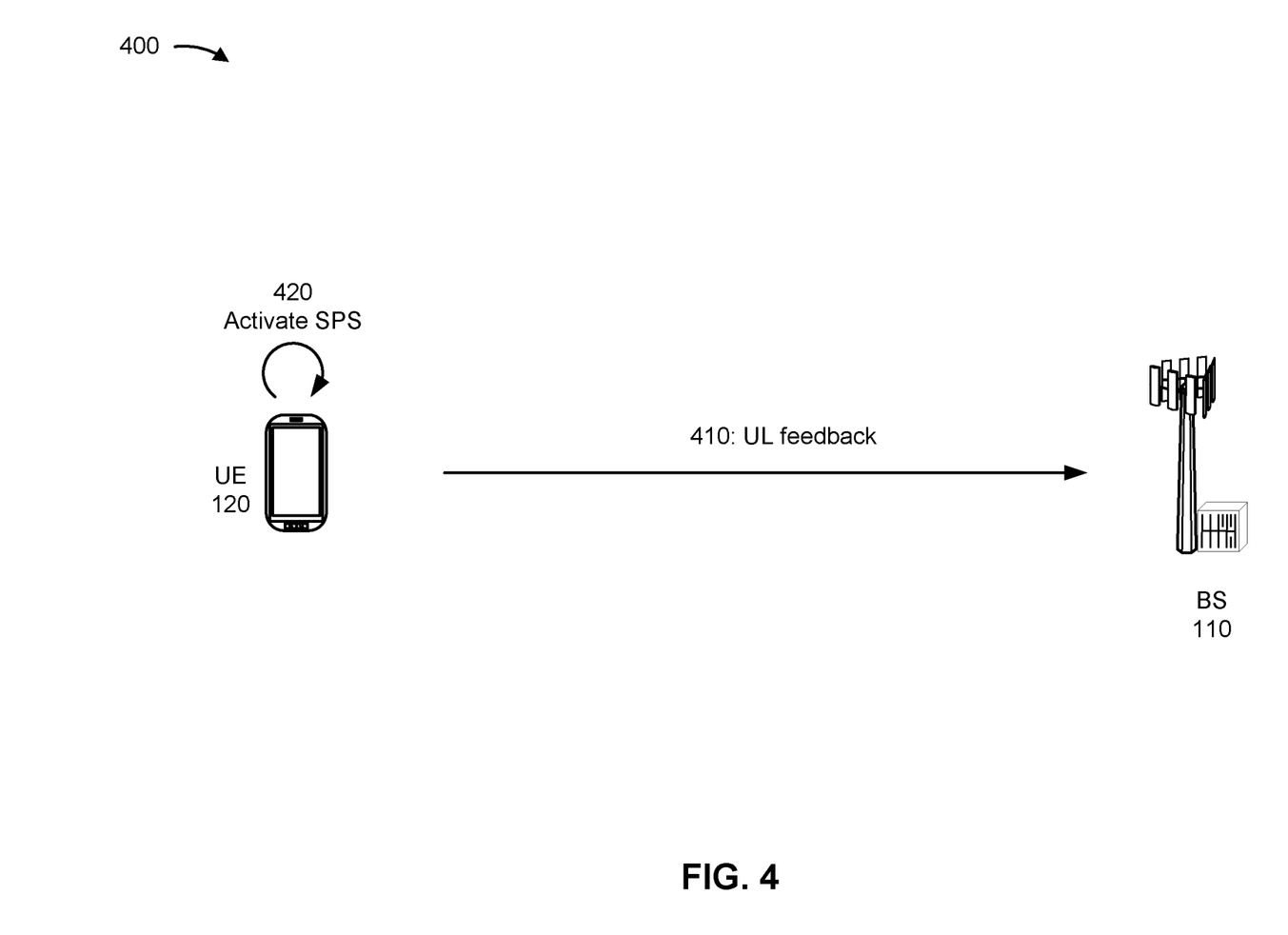
FIG. 4 is a diagram illustrating an example of uplink feedback-based activation, in accordance with the present disclosure.

FIG. 4 is a diagram illustrating an example 400 of uplink feedback-based activation, in accordance with the present disclosure. As shown in FIG. 4, example 400 includes a BS 110 and a UE 120.

As further shown in FIG. 4, and by reference number 410, UE 120 may transmit, to BS 110, uplink feedback. For example, UE 120 may transmit uplink feedback, such as hybrid automatic repeat request (HARQ) feedback, that includes one or more bits to indicate one or more acknowledgements (ACKs) or negative acknowledgements (NACKs) for one or more communications. In some aspects, UE 120 may transmit uplink feedback that includes one or more ACKs, one or more NACKs, a combination of one or more ACKs and one or more NACKs, and/or the like. In some aspects, UE 120 may transmit uplink feedback including an activation indicator. For example, UE 120 may transmit uplink feedback with an explicit indicator to request activation of an identified SPS configuration associated with a particular SPS configuration identifier. In this case, UE 120 may use a single bit configured to correspond to a single SPS configuration identifier to request an activation of an SPS occasion (also referred to herein as an SPS procedure) and/or utilization of pre-configured retransmission resources (e.g., time resources and/or frequency resources). Additionally, or alternatively, UE 120 may use a plurality of bits to explicitly identify an SPS configuration identifier. In some aspects, UE 120 may transmit the explicit indicator separate from the uplink feedback.

In some aspects, UE 120 may include scheduling information in the uplink feedback. For example, UE 120 may identify scheduling information for a retransmission resource to enable activation of use of the retransmission resource. In some aspects, the scheduling information may conflict with previously configured scheduling information. In this case, UE 120 and/or BS 110 may overwrite the previously configured scheduling information with the UE-signaled scheduling information.

As further shown in FIG. 4, and by reference number 420, UE 120 may activate an SPS occasion and/or utilization of pre-configured retransmission resources. For example, based at least in part on transmitting uplink feedback with at least one NACK, UE 120 may activate the SPS occasion. In this way, UE 120 obviates a need to receive a DCI from BS 110, thereby reducing a utilization of network resources. In some aspects, UE 120 may activate the SPS occasion based at least in part on the at least one NACK corresponding to a particular hybrid automatic repeat request (HARQ) identifier.

Additionally, or alternatively, UE 120 may activate SPS/CG transmission based at least in part on the at least one NACK relating to a particular physical layer (PHY) priority. For example, when UE 120 detects a failure of a physical downlink shared channel (PDSCH) with a relatively high priority (e.g., as indicated in a scheduling DCI including a priority indicator for the PDSCH), UE 120 may transmit a NACK to indicate the failure of the PDSCH and may automatically activate SPS/CG transmission. In some aspects, UE 120 may activate an SPS occasion or utilization of pre-configured retransmission resources based at least in part on the uplink feedback including only NACKs. For example, UE 120 may determine that the uplink feedback includes one or more NACKs and no ACKs and may determine to activate the SPS occasion and/or the pre-configured retransmission resources to enable retransmission of a failed communication.

In some aspects, UE 120 may activate the SPS occasion with a particular SPS configuration. For example, UE 120 may use a pre-configured SPS configuration that identifies a set of time resources, a set of frequency resources, a modulation and coding scheme (MCS), a beam, a periodicity, an offset for a start time, and/or the like for an SPS communication. In this case, UE 120 may start SPS communication at a particular time after transmitting the uplink feedback, such as at a first scheduled SPS after transmitting the uplink feedback, a first scheduled SPS that is a minimum or threshold time period (e.g., a UE and/or BS processing time) after transmitting the uplink feedback, and/or the like.

Additionally, or alternatively, UE 120 may activate the SPS occasion with an UL feedback indicated SPS configuration. For example, UE 120 may explicitly identify a configuration for the SPS occasion that UE 120 is to use when transmitting the UL feedback. Additionally, or alternatively, UE 120 may transmit UL feedback that enables BS 110 to implicitly identify the SPS configuration. For example, a timing of the UL feedback may correspond to a particular SPS configuration of a plurality of possible SPS configurations.

As indicated above, FIG. 4 is provided as an example. Other examples may differ from what is described with respect to FIG. 4.

Figure 5:
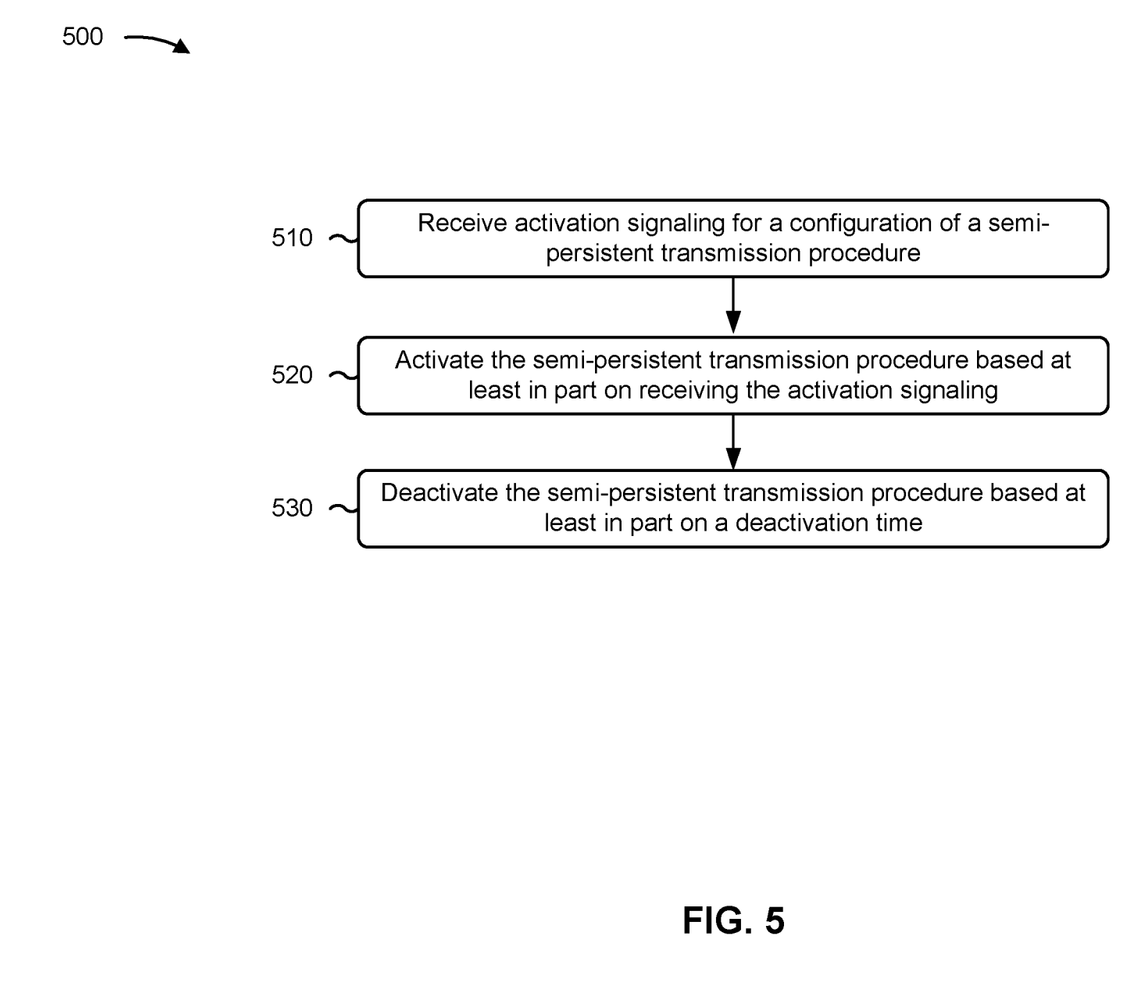
FIG. 5 is a diagram illustrating an example process performed, for example, by a user equipment, in accordance with the present disclosure.

FIG. 5 is a diagram illustrating an example process 500 performed, for example, by a UE, in accordance with the present disclosure. Example process 500 is an example where the UE (e.g., UE 120 and/or the like) performs operations associated with pre-configured deactivation.

As shown in FIG. 5, in some aspects, process 500 may include receiving activation signaling for a configuration of a semi-persistent transmission procedure (block 510). For example, the UE (e.g., using receive processor 258, transmit processor 264, controller/processor 280, memory 282, and/ or the like) may receive activation signaling for a configuration of a semi-persistent transmission procedure, as described above with reference to FIG. 3. In some aspects, the activation signaling may relate to an SPS transmission procedure occasion. For example, the activation signaling may activate the configuration for one or more SPS transmission procedure occasions (e.g., one or more SPS occasions).

As further shown in FIG. 5, in some aspects, process 500 may include activating the semi-persistent transmission procedure based at least in part on receiving the activation signaling (block 520). For example, the UE (e.g., using receive processor 258, transmit processor 264, controller/ processor 280, memory 282, and/or the like) may activate the semi-persistent transmission procedure based at least in part on receiving the activation signaling, as described above with reference to FIG. 3.

As further shown in FIG. 5, in some aspects, process 500 may include deactivating the semi-persistent transmission procedure based at least in part on a deactivation time (block 530). For example, the UE (e.g., using receive processor 258, transmit processor 264, controller/processor 280, memory 282, and/or the like) may deactivate the semi-persistent transmission procedure based at least in part on a deactivation time, as described above with reference to FIG. 3.

Process 500 may include additional aspects, such as any single aspect or any combination of aspects described below and/or in connection with one or more other processes described elsewhere herein.

In a first aspect, process 500 includes receiving signaling identifying the deactivation time.

In a second aspect, alone or in combination with the first aspect, the signaling is at least one of: radio resource control signaling, medium access control signaling, or downlink control information signaling.

In a third aspect, alone or in combination with one or more of the first and second aspects, the deactivation time is indicated for a single SPS/CG configuration identifier.

In a fourth aspect, alone or in combination with one or more of the first through third aspects, the deactivation time is indicated for a plurality of SPS/CG configuration identifiers.

In a fifth aspect, alone or in combination with one or more of the first through fourth aspects, the signaling is conveyed via at least one of: a broadcast message, a multicast message, or group-common downlink control information.

In a sixth aspect, alone or in combination with one or more of the first through fifth aspects, the semi-persistent transmission procedure is a semi-persistent scheduling (SPS)/configured grant (CG) transmission procedure.

In a seventh aspect, alone or in combination with one or more of the first through sixth aspects, the semi-persistent transmission procedure is at least one of a semi-persistent channel state information reference signal transmission procedure, a semi-persistent sounding reference signal transmission procedure, or a discontinuous reception transmission procedure.

In an eighth aspect, alone or in combination with one or more of the first through seventh aspects, process 500 includes detecting further transmission activity during the semi-persistent transmission procedure and extending the semi-persistent transmission procedure based at least in part on detecting the further transmission activity, and deactivating the semi-persistent transmission procedure includes deactivating the semi-persistent transmission procedure based at least in part on extending the semi-persistent transmission procedure.

In a ninth aspect, alone or in combination with one or more of the first through eighth aspects, process 500 includes detecting a lack of transmission activity during the semi-persistent transmission procedure, and deactivating the semi-persistent transmission procedure includes preemptively deactivating the semi-persistent transmission procedure, before the deactivation time, based at least in part on detecting the lack of transmission activity.

In a tenth aspect, alone or in combination with one or more of the first through ninth aspects, process 500 includes resuming a default semi-persistent transmission procedure configuration based at least in part on deactivating the semi-persistent transmission procedure.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
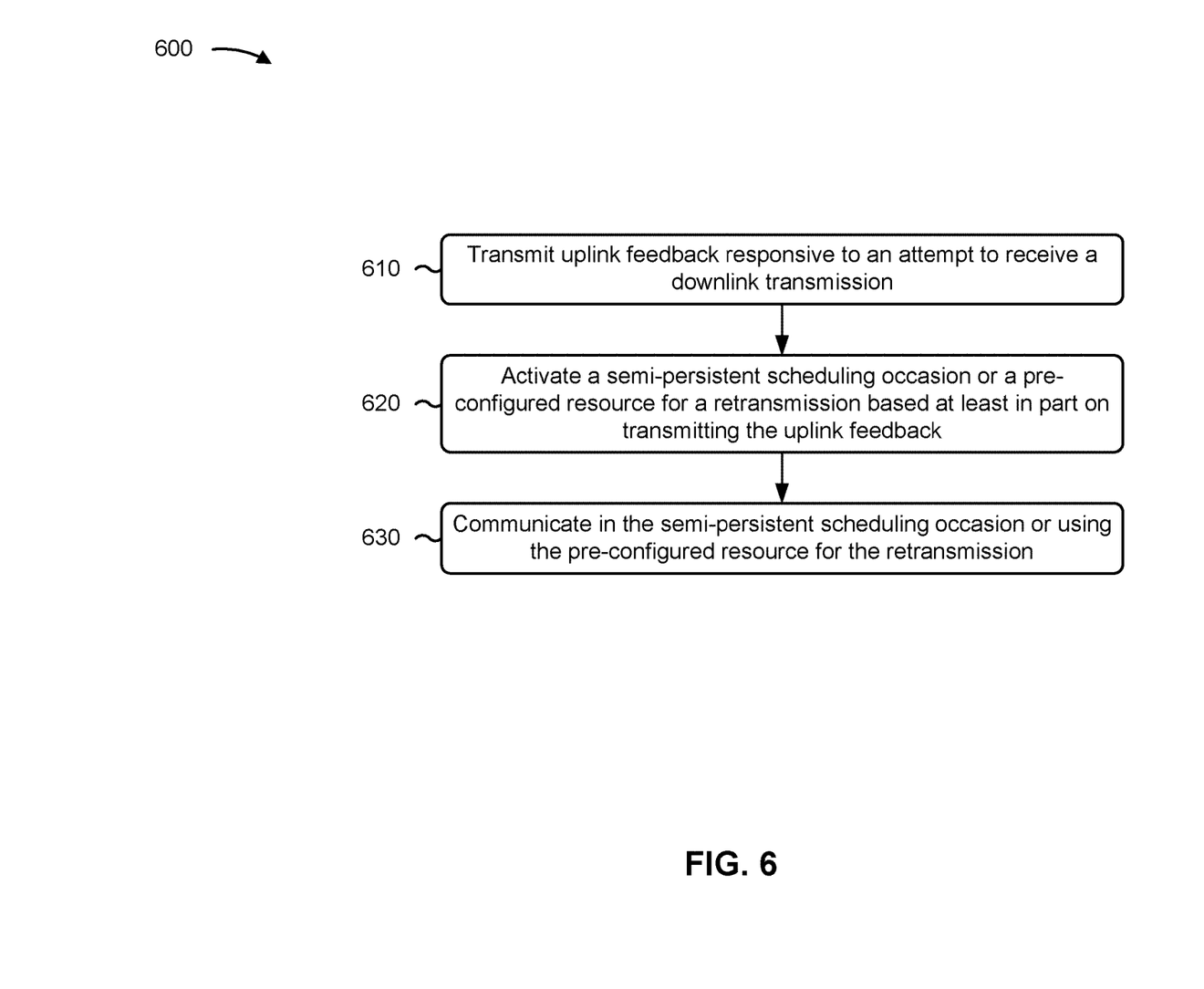
FIG. 6 is a diagram illustrating an example process performed, for example, by a user equipment, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with uplink feedback-based activation.

As shown in FIG. 6, in some aspects, process 600 may include transmitting uplink feedback responsive to an attempt to receive a downlink transmission (block 610). For example, the UE (e.g., using receive processor 258, transmit processor 264, controller/processor 280, memory 282, and/ or the like) may transmit uplink feedback responsive to an attempt to receive a downlink transmission, as described above with reference to FIG. 4.

As further shown in FIG. 6, in some aspects, process 600 may include activating a semi-persistent scheduling occasion or a pre-configured resource for a retransmission based at least in part on transmitting the uplink feedback (block 620). For example, the UE (e.g., using receive processor 258, transmit processor 264, controller/processor 280, memory 282, and/or the like) may activate a semi-persistent scheduling occasion or a pre-configured resource for a retransmission based at least in part on transmitting the uplink feedback, as described above with reference to FIG. 4.

As further shown in FIG. 6, in some aspects, process 600 may include communicating in the semi-persistent scheduling occasion or using the pre-configured resource for the retransmission (block 630). For example, the UE (e.g., using receive processor 258, transmit processor 264, controller/processor 280, memory 282, and/or the like) may communicate in the semi-persistent scheduling occasion or using the pre-configured resource for the retransmission, as described above with reference to FIG. 4.

Process 600 may include additional aspects, such as any single aspect or any combination of aspects described below and/or in connection with one or more other processes described elsewhere herein.

In a first aspect, the uplink feedback includes one or more acknowledgement or negative acknowledgement bits.

In a second aspect, alone or in combination with the first aspect, activating the semi-persistent scheduling occasion or the pre-configured resource includes activating the semi-persistent scheduling occasion or the pre-configured resource based at least in part on the uplink feedback including at least one negative acknowledgement.

In a third aspect, alone or in combination with one or more of the first and second aspects, the at least one negative acknowledgement relates to a pre-configured hybrid automatic repeat request identifier or physical layer priority.

In a fourth aspect, alone or in combination with one or more of the first through third aspects, activating the semi-persistent scheduling occasion or the pre-configured resource includes activating the semi-persistent scheduling occasion or the pre-configured resource based at least in part on the uplink feedback including only one or more negative acknowledgements.

In a fifth aspect, alone or in combination with one or more of the first through fourth aspects, the uplink feedback includes scheduling information for the pre-configured resource.

In a sixth aspect, alone or in combination with one or more of the first through fifth aspects, the scheduling information overrides pre-configured scheduling for the pre-configured resource.

In a seventh aspect, alone or in combination with one or more of the first through sixth aspects, the uplink feedback includes an activation indication for a particular semi-persistent scheduling configuration identifier of a plurality of semi-persistent scheduling configuration identifiers.

In an eighth aspect, alone or in combination with one or more of the first through seventh aspects, the activation indication is conveyed with one or more feedback bits of the uplink feedback.

In a ninth aspect, alone or in combination with one or more of the first through eighth aspects, the activation indication is conveyed in a separate transmission from feedback bits of the uplink feedback.

In a tenth aspect, alone or in combination with one or more of the first through ninth aspects, a configuration of the semi-persistent scheduling occasion includes at least one of: a time resource, a frequency resource, a modulation and coding scheme, a beam, a periodicity, or a start time offset.

In an eleventh aspect, alone or in combination with one or more of the first through tenth aspects, activating the semi-persistent scheduling occasion comprises activating the semi-persistent scheduling occasion at a first opportunity that is a threshold time after the uplink feedback.

In a twelfth aspect, alone or in combination with one or more of the first through eleventh aspects, the uplink feedback explicitly indicates one or more parameters of a configuration of the semi-persistent scheduling occasion.

In a thirteenth aspect, alone or in combination with one or more of the first through twelfth aspects, the uplink feedback implicitly indicates one or more parameters of a configuration of the semi-persistent scheduling occasion.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: receiving activation signaling for a configuration of a semi-persistent transmission procedure; activating the semi-persistent transmission procedure based at least in part on receiving the activation signaling; and deactivating the semi-persistent transmission procedure based at least in part on a deactivation time.

Aspect 2: The method of Aspect 1, further comprising: receiving signaling identifying the deactivation time.

Aspect 3: The method of Aspect 2, wherein the signaling is at least one of: radio resource control signaling, medium access control signaling, or downlink control information signaling.

Aspect 4: The method of any of Aspects 1-3, wherein the deactivation time is indicated for a single semi-persistent scheduling (SPS)/configured grant (CG) configuration identifier.

Aspect 5: The method of any of Aspects 1-3, wherein the deactivation time is indicated for a plurality of SPS/CG configuration identifiers.

Aspect 6: The method of any of Aspects 1-5, wherein the signaling is conveyed via at least one of: a broadcast message, a multicast message, or group-common downlink control information.

Aspect 7: The method of any of Aspects 1-6, wherein the semi-persistent transmission procedure is a semi-persistent scheduling (SPS)/configured grant (CG) transmission procedure.

Aspect 8: The method of any of Aspects 1-7, wherein the semi-persistent transmission procedure is at least one of a semi-persistent channel state information reference signal transmission procedure, a semi-persistent sounding reference signal transmission procedure, or a discontinuous reception transmission procedure.

Aspect 9: The method of any of Aspects 1-8, further comprising: detecting further transmission activity during the semi-persistent transmission procedure; and extending the semi-persistent transmission procedure based at least in part on detecting the further transmission activity; and wherein deactivating the semi-persistent transmission procedure comprises: deactivating the semi-persistent transmission procedure based at least in part on extending the semi-persistent transmission procedure.

Aspect 10: The method of Aspect 1, further comprising: detecting a lack of transmission activity during the semi-persistent transmission procedure; and wherein deactivating the semi-persistent transmission procedure comprises: pre-emptively deactivating the semi-persistent transmission procedure, before the deactivation time, based at least in part on detecting the lack of transmission activity.

Aspect 11: The method of Aspect 1, further comprising: resuming a default semi-persistent transmission procedure configuration based at least in part on deactivating the semi-persistent transmission procedure.

Aspect 12: A method of wireless communication performed by a user equipment (UE), comprising: transmitting uplink feedback responsive to an attempt to receive a downlink transmission; activating a semi-persistent scheduling occasion or a pre-configured resource for a retransmission based at least in part on transmitting the uplink feedback; and communicating in the semi-persistent scheduling occasion or using the pre-configured resource for the retransmission.

Aspect 13: The method of Aspect 12, wherein the uplink feedback includes one or more acknowledgement or negative acknowledgement bits.

Aspect 14: The method of any of Aspects 12-13, wherein activating the semi-persistent scheduling occasion or the pre-configured resource comprises: activating the semi-persistent scheduling occasion or the pre-configured resource based at least in part on the uplink feedback including at least one negative acknowledgement.

Aspect 15: The method of Aspect 14, wherein the at least one negative acknowledgement relates to a pre-configured hybrid automatic repeat request identifier or physical layer priority.

Aspect 16: The method of any of Aspects 12-15, wherein activating the semi-persistent scheduling occasion or the pre-configured resource comprises: activating the semi-persistent scheduling occasion or the pre-configured resource based at least in part on the uplink feedback including only one or more negative acknowledgements.

Aspect 17: The method of any of Aspects 12-16, wherein the uplink feedback includes scheduling information for the pre-configured resource.

Aspect 18: The method of Aspect 17, wherein the scheduling information overrides pre-configured scheduling for the pre-configured resource.

Aspect 19: The method of any of Aspects 12-18, wherein the uplink feedback includes an activation indication for a particular semi-persistent scheduling configuration identifier of a plurality of semi-persistent scheduling configuration identifiers.

Aspect 20: The method of Aspect 19, wherein the activation indication is conveyed with one or more feedback bits of the uplink feedback.

Aspect 21: The method of Aspect 19, wherein the activation indication is conveyed in a separate transmission from feedback bits of the uplink feedback.

Aspect 22: The method of any of Aspects 12-21, wherein a configuration of the semi-persistent scheduling occasion includes at least one of: a time resource, a frequency resource, a modulation and coding scheme, a beam, a periodicity, or a start time offset.

Aspect 23: The method of any of Aspects 12-22, wherein activating the semi-persistent scheduling occasion comprises activating the semi-persistent scheduling occasion at a first opportunity a threshold time after the uplink feedback.

Aspect 24: The method of any of Aspects 12-23, wherein the uplink feedback explicitly indicates one or more parameters of a configuration of the semi-persistent scheduling occasion.

Aspect 25: The method of any of Aspects 12-24, wherein the uplink feedback implicitly indicates one or more parameters of a configuration of the semi-persistent scheduling occasion.

Aspect 26: An apparatus for wireless communication at a device, comprising a processor; memory coupled with the processor; and instructions stored in the memory and executable by the processor to cause the apparatus to perform the method of one or more Aspects of Aspects 1-11.

Aspect 27: A device for wireless communication, comprising a memory and one or more processors coupled to the memory, the memory and the one or more processors configured to perform the method of one or more Aspects of Aspects 1-11.

Aspect 28: An apparatus for wireless communication, comprising at least one means for performing the method of one or more Aspects of Aspects 1-11.

Aspect 29: A non-transitory computer-readable medium storing code for wireless communication, the code comprising instructions executable by a processor to perform the method of one or more Aspects of Aspects 1-11.

Aspect 30: A non-transitory computer-readable medium storing a set of instructions for wireless communication, the set of instructions comprising one or more instructions that, when executed by one or more processors of a device, cause the device to perform the method of one or more Aspects of Aspects 1-11.

Aspect 31: An apparatus for wireless communication at a device, comprising a processor; memory coupled with the processor; and instructions stored in the memory and executable by the processor to cause the apparatus to perform the method of one or more Aspects of Aspects 12-25.

Aspect 32: A device for wireless communication, comprising a memory and one or more processors coupled to the memory, the memory and the one or more processors configured to perform the method of one or more Aspects of Aspects 12-25.

Aspect 33: An apparatus for wireless communication, comprising at least one means for performing the method of one or more Aspects of Aspects 12-25.

Aspect 34: A non-transitory computer-readable medium storing code for wireless communication, the code comprising instructions executable by a processor to perform the method of one or more Aspects of Aspects 12-25.

Aspect 35: A non-transitory computer-readable medium storing a set of instructions for wireless communication, the set of instructions comprising one or more instructions that, when executed by one or more processors of a device, cause the device to perform the method of one or more Aspects of Aspects 12-25.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting uplink feedback responsive to an attempt to receive a downlink transmission, wherein the uplink feedback comprises an indication of a configuration identifier corresponding to a resource for retransmission;
   activating, based at least in part on transmitting the uplink feedback, the resource for retransmission, wherein the resource comprises a semi-persistent scheduling occasion; and
   receiving the retransmission in the semi-persistent scheduling occasion.

2. The method of claim 1, wherein the uplink feedback includes one or more acknowledgement or negative acknowledgement bits.

3. The method of claim 1, wherein activating the semi-persistent scheduling occasion:
   activating the resource based at least in part on the uplink feedback including at least one negative acknowledgement.

4. The method of claim 3, wherein the at least one negative acknowledgement relates to a pre-configured hybrid automatic repeat request identifier or physical layer priority.

5. The method of claim 1, wherein activating the semi-persistent scheduling occasion:
   activating the resource based at least in part on the uplink feedback including only one or more negative acknowledgements.

6. The method of claim 1, wherein the uplink feedback includes scheduling information for the resource.

7. The method of claim 6, wherein the scheduling information overrides pre-configured scheduling for the resource.

8. The method of claim 1, wherein the configuration identifier includes an activation indication for a particular semi-persistent scheduling configuration identifier of a plurality of semi-persistent scheduling configuration identifiers.

9. The method of claim 8, wherein the activation indication is conveyed with one or more feedback bits of the uplink feedback.

10. The method of claim 8, wherein the activation indication is conveyed in a separate transmission from feedback bits of the uplink feedback.

11. The method of claim 1, wherein a configuration of the semi-persistent scheduling occasion includes at least one of: a time resource, a frequency resource, a modulation and coding scheme, a beam, a periodicity, or a start time offset.

12. The method of claim 1, wherein activating the semi-persistent scheduling occasion comprises activating the semi-persistent scheduling occasion at a first opportunity a threshold time after the uplink feedback.

13. The method of claim 1, wherein the uplink feedback explicitly indicates one or more parameters of a configuration of the semi-persistent scheduling occasion.

14. The method of claim 1, wherein the uplink feedback implicitly indicates one or more parameters of a configuration of the semi-persistent scheduling occasion.

15. A user equipment (UE) for wireless communication, comprising:
   a memory; and
   one or more processors coupled to the memory, the one or more processors configured to:
      transmit uplink feedback responsive to an attempt to receive a downlink transmission, wherein the uplink feedback comprises an indication of a configuration identifier corresponding to a resource for retransmission;
      activate, based at least in part on transmitting the uplink feedback, the resource for retransmission, wherein the resource comprises a semi-persistent scheduling occasion; and
      receive the retransmission in the semi-persistent scheduling occasion.

16. The UE of claim 15, wherein the uplink feedback includes one or more acknowledgement bits.

17. The UE of claim 15, wherein the uplink feedback includes one or more negative acknowledgement bits.

18. The UE of claim 15, wherein the one or more processors, to activate the semi-persistent scheduling occasion or the pre-configured resource, are further configured to cause the UE to:
activate the resource based at least in part on the uplink feedback including at least one negative acknowledgement.

19. The UE of claim 18, wherein the at least one negative acknowledgement relates to a pre-configured hybrid automatic repeat request identifier or physical layer priority.

20. The UE of claim 15, wherein activating the semi-persistent scheduling occasion:
activating the resource based at least in part on the uplink feedback including only one or more negative acknowledgements.

21. The UE of claim 15, wherein the uplink feedback includes scheduling information for the pre-configured resource.

22. The UE of claim 21, wherein the scheduling information overrides pre-configured scheduling for the pre configured resource.

23. The UE of claim 15, wherein the configuration identifier includes an activation indication for a particular semi-persistent scheduling configuration identifier of a plurality of semi-persistent scheduling configuration identifiers.

24. The UE of claim 23, wherein the activation indication is conveyed with one or more feedback bits of the uplink feedback.

25. The UE of claim 24, wherein the activation indication is conveyed in a separate transmission from feedback bits of the uplink feedback.

26. The UE of claim 15, wherein a configuration of the semi-persistent scheduling occasion includes at least one of: a time resource, a frequency resource, a modulation and coding scheme, a beam, a periodicity, or a start time offset.

27. The UE of claim 15, wherein activating the semi-persistent scheduling occasion comprises activating the semi-persistent scheduling occasion at a first opportunity a threshold time after the uplink feedback.

28. The UE of claim 15, wherein the uplink feedback explicitly indicates one or more parameters of a configuration of the semi-persistent scheduling occasion.

29. A non-transitory computer-readable medium storing one or more instructions for wireless communication, the one or more instructions comprising:
one or more instructions that, when executed by one or more processors of a user equipment (UE), cause the one or more processors to:
transmit uplink feedback responsive to an attempt to receive a downlink transmission, wherein the uplink feedback comprises an indication of a configuration identifier corresponding to a resource for retransmission;
activate, based at least in part on transmitting the uplink feedback, the resource for retransmission, wherein the resource comprises a semi-persistent scheduling occasion; and
receive the retransmission in the semi-persistent scheduling occasion.

30. An apparatus for wireless communication, comprising:
means for transmitting uplink feedback responsive to an attempt to receive a downlink transmission, wherein the uplink feedback comprises an indication of a configuration identifier corresponding to a resource for retransmission;
means for activating, based at least in part on transmitting the uplink feedback, the resource for retransmission, wherein the resource comprises a semi-persistent scheduling occasion; and
means for receiving the retransmission in the semi-persistent scheduling occasion.

* * * * *